US009711795B2

(12) United States Patent
Cho et al.

(10) Patent No.: US 9,711,795 B2
(45) Date of Patent: Jul. 18, 2017

(54) ANODE ELECTRODES FOR SECONDARY BATTERY AND LITHIUM SECONDARY BATTERY CONTAINING THE SAME

(71) Applicant: LG CHEM, LTD., Seoul (KR)

(72) Inventors: SangEun Cho, Daejeon (KR); Hyun Chul Ha, Daejeon (KR); Jonghyun Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 375 days.

(21) Appl. No.: 14/244,066

(22) Filed: Apr. 3, 2014

(65) Prior Publication Data
US 2014/0335408 A1 Nov. 13, 2014

(30) Foreign Application Priority Data

Apr. 4, 2013 (KR) .................. 10-2013-0036795

(51) Int. Cl.
| | |
|---|---|
| *H01M 4/485* | (2010.01) |
| *H01M 4/62* | (2006.01) |
| *H01M 4/131* | (2010.01) |
| *H01M 4/02* | (2006.01) |
| *H01M 10/052* | (2010.01) |

(52) U.S. Cl.
CPC .......... *H01M 4/622* (2013.01); *H01M 4/131* (2013.01); *H01M 4/485* (2013.01); *H01M 4/623* (2013.01); *H01M 10/052* (2013.01); *H01M 2004/027* (2013.01); *H01M 2220/10* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,707,760 A | * | 1/1998 | Stux | ............... H01M 10/052 429/188 |
| 2009/0263707 A1 | * | 10/2009 | Buckley | ............... H01M 4/622 429/94 |
| 2011/0189544 A1 | | 8/2011 | Kim et al. | |

FOREIGN PATENT DOCUMENTS

| | | |
|---|---|---|
| KR | 2000-0055680 A | 9/2000 |
| KR | 1020110090026 A | 8/2011 |

* cited by examiner

*Primary Examiner* — Maria J Laios
(74) *Attorney, Agent, or Firm* — Birch, Stewart, Kolasch & Birch, LLP

(57) ABSTRACT

Disclosed is an anode for secondary batteries, in which an anode mixture including an anode active material and a binder is coated on a current collector, wherein the binder includes a homopolymer having a molecular weight of 1,000,000 to 1,400,000 and the anode active material includes a lithium metal oxide represented by Formula 1 below:

$$Li_xM_yO_z \qquad (1)$$

wherein M is Ti, Sn, Cu, Pb, Sb, Zn, Fe, In, Al, or Zr; and x, y, and z are determined according to oxidation number of M.

7 Claims, 1 Drawing Sheet

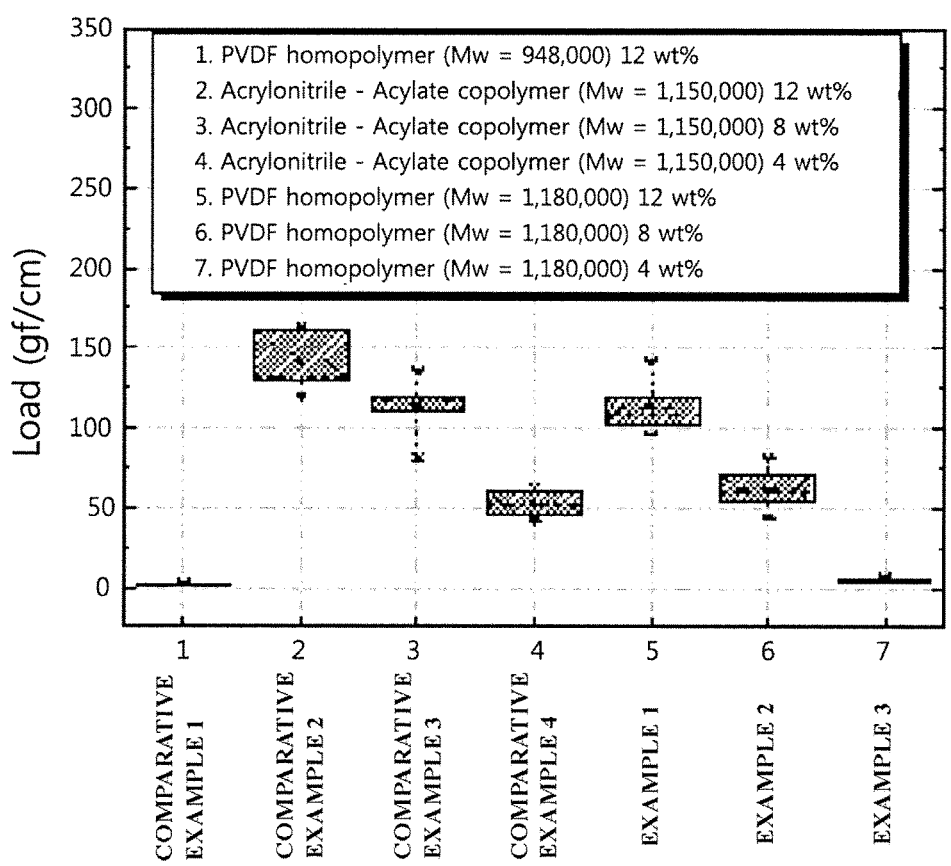

ANODE ELECTRODES FOR SECONDARY BATTERY AND LITHIUM SECONDARY BATTERY CONTAINING THE SAME

TECHNICAL FIELD

The present invention relates to an anode for secondary batteries and a lithium secondary battery including the same and, more particularly, to an anode for secondary batteries in which an anode mixture including an anode active material and a binder is coated on a current collector, wherein the binder includes a homopolymer having a molecular weight of 1,000,000 to 1,400,000 and the anode active material includes a lithium metal oxide represented by Formula 1 below:

$$Li_3M'_bO_{4-c}A_c \qquad (1)$$

wherein M' is at least one element selected from the group consisting of titanium (Ti), tin (Sn), copper (Cu), lead (Pb), antimony (Sb), zinc (Zn), iron (Fe), indium (In), aluminum (Al), and zirconium (Zr):

0.1≤a≤4 and 0.2≤b≤4 wherein a and b are determined according to oxidation number of M';

0≤c<0.2 wherein c is determined according to oxidation number of A; and

A is at least one monovalent or divalent anion.

BACKGROUND ART

As energy prices are increasing due to depletion of fossil fuels and interest in environmental pollution is on the rise, demand for environmentally friendly alternative energy sources is bound to play an increasing role in future life. Thus, research into various power generation techniques such as nuclear energy, solar energy, wind energy, tidal power, and the like, continues, and power storage devices for more efficient use of the generated energy are also drawing much attention.

In particular, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and use thereof continues to expand to applications such as auxiliary power supplies through smart-grid technology.

Anodes of conventional lithium secondary batteries mainly use, as an anode active material, carbon-based compounds that maintain structural and electrical properties and enable reversible intercalation and deintercalation of lithium ions. However, recently, research into anode materials prepared by alloying Li with silicon (Si) or tin (Sn) and lithium titanium oxides instead of conventional carbon-based anode materials has been underway.

Lithium titanium oxides are materials that hardly undergo structural changes during charging and discharging and thus exhibit zero strain. In addition, lithium titanium oxides are known to have excellent lifespan characteristics, have a relatively high voltage range, and not to form dendrites, thus exhibiting excellent safety and stability.

However, such lithium titanium oxides require a larger amount of binder than conventional carbon-based anode active materials due to wide surface area thereof. When the amount of the binder in an electrode increases, the thickness of the electrode increases to realize the same capacity and cell resistance increases. In this regard, the cell resistance increases as a binder having a higher molecular weight is used.

Adhesion of an electrode affects electrode processability and electrode performance stability. Insufficient adhesion causes electrode separation during drying, pressing, and the like of an electrode and thus increases an electrode defect rate. In addition, separation of an electrode with low adhesion even by external impact to a battery may adversely affect lifespan characteristics and the like of the battery and such electrode separation increases contact resistance between an electrode material and a current collector, which is a cause of reduction in electrode output performance.

However, when the amount of binder increases in order to address adhesion problems, the amount of active material decreases and the binder acts as a resistance in an electrode and, accordingly, battery performance is deteriorated.

Therefore, there is a very urgent need to develop technology for enhancing battery capacity by securing adhesion between an active material and a current collector and enhancing overall battery performance.

DISCLOSURE

Technical Problem

Therefore, the present invention has been made to solve the above problems and other technical problems that have yet to be resolved.

As a result of a variety of intensive studies and various experiments, the inventors of the present invention confirmed that, when an anode mixture including a predetermined lithium metal oxide as an anode active material includes a homopolymer having a high molecular weight as a binder, excellent adhesion may be obtained and battery performance may be enhanced, thus completing the present invention.

Technical Solution

In accordance with one aspect of the present invention, provided is an anode for secondary batteries in which an anode mixture including an anode active material and a binder is coated on a current collector, wherein the binder includes a homopolymer having a molecular weight of 1,000,000 to 1,400,000 and the anode active material is a lithium metal oxide represented by Formula 1 below:

$$Li_aM'_bO_{4-c}A_c \qquad (1)$$

wherein M' is at least one element selected from the group consisting of titanium (Ti), tin (Sn), copper (Cu), lead (Pb), antimony (Sb), zinc (Zn), iron (Fe), indium (In), aluminum (Al), and zirconium (Zr);

0.1≤a≤4 and 0.2≤b≤4 wherein a and b are determined according to oxidation number of M';

0≤c≤0.2 wherein c is determined according to oxidation number of A; and

A is at least one monovalent or divalent anion.

In general, when an anode active material having a small particle size, such as lithium metal oxide particles, is used, a binder permeates interparticle pores or pores in particles and thus low adhesion with respect to the amount of the binder between active material components or between an active material and a current collector is exhibited and thus a greater amount of binder than needed may be used.

By contrast, the anode for secondary batteries according to the present invention includes a high molecular weight binder and thus may exhibit excellent adhesion even when used in a small amount.

In particular, polymer chains of the high molecular weight binder effectively surround a surface of the anode active material and thus mechanical adhesion may be enhanced. In addition, the amount of binder that permeates interparticle pores or pores in particles of the anode active material is reduced and thus the amount of binder that is unable to contribute to adhesion enhancement may be minimized and, accordingly, overall battery performance may be enhanced.

The high molecular weight binder may include a homopolymer. The homopolymer may, for example, be at least one selected from the group consisting of polyvinylidene fluoride (PVdF), polyvinyl alcohols, carboxymethylcellulose (CMC), starch, hydroxypropylcellulose, regenerated cellulose, polyvinyl pyrrolidone, tetrafluoroethylene, polyethylene, and polypropylene. In particular, the homopolymer may be PVdF.

As described above, when the molecular weight of the homopolymer is too small, the binder permeates between anode active material particles and thus low adhesion with respect to the amount of the binder may be exhibited. On the other hand, when the molecular weight of the homopolymer is too great, electrode processability may be hindered. Thus, the homopolymer may particularly have a molecular weight of 1,100,000 to 1,300,000.

The amount of the high molecular weight binder may be 2 wt % to 20 wt %, in particular 3 wt % to 15 wt %, based on the amount of solids of the anode mixture. When the amount of the binder is too great, the thickness of the electrode increases to realize the same capacity and thus cell resistance may increase. On the other hand, when the amount of the binder is too small, enhancement effects of adhesion between electrode active material components or between an electrode active material and a current collector by the binder may not be obtained.

The oxide of Formula 1 may be represented by Formula 2 below:

$$Li_aTi_bO_4 \tag{2}$$

wherein $0.5 \le a \le 3$ and $1 \le b \le 2.5$.

More particularly, the oxide of Formula 1 may be $Li_{1.33}Ti_{1.67}O_4$ or $LiTi_2O_4$.

Such lithium titanium oxides have small particle sizes, large specific surface areas and non-uniform particle shapes and thus it is not easy to prepare an electrode mixture by mixing with a binder and a conductive material and, consequently, binding strength between lithium titanium oxide particles or adhesion between the lithium titanium oxide and a current collector is reduced. In addition, lithium titanium oxides are generally used in the form of secondary particles and thus a binder may permeate interparticle pores, which may aggravate such binding strength reduction problems.

Thus, in the present invention, the high molecular weight binder is used and the lithium titanium oxide described above is used as an anode active material. In this case, optimum adhesion may be obtained and overall battery performance may be enhanced.

The present invention also provides a secondary battery including the anode for secondary batteries.

The secondary battery according to the present invention includes the anode described above and a cathode fabricated by coating, on a cathode current collector, a mixture of a cathode active material, a conductive material, and a binder and drying and pressing the coated cathode current collector. In this case, as desired, the mixture may further include a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The cathode active material is a lithium transition metal oxide including at least two transition metals. Examples of lithium transition metal oxides include, but are not limited to, layered compounds substituted with one or more transition metals such as lithium cobalt oxide ($LiCoO_2$) and lithium nickel oxide ($LiNiO_2$); lithium manganese oxides substituted with one or more transition metals; lithium nickel-based oxides represented by the formula $LiNi_{1-y}M_yO_2$ where M is at least one of Co, Mn, Al, Cu, Fe, Mg, B, Cr, Zn, and Ga and $0.01 \le y \le 0.7$); lithium nickel cobalt manganese composite oxides represented by the formula $Li_{1+z}Ni_bMn_cCo_{1-(b+c+d)}M_dO_{(2-e)}A_e$ where $-0.55 \le z \le 0.5$, $0.1 \le b \le 0.8$, $0.1 \le c \le 0.8$, $0 \le d \le 0.2$, $0 \le e \le 0.2$, $b+c+d<1$, M=Al, Mg, Cr, Ti, Si, or Y, and A=F, P, or Cl, such as $Li_{1+z}Ni_{1/3}Co_{1/3}Mn_{1/3}O_2$ and $Li_{1+z}Ni_{0.4}Mn_{0.4}Co_{0.2}O_2$; and olivine-based lithium metal phosphates represented by the formula $Li_{1+x}M_{1-y}M'_yPO_{4-z}X_z$ where M is a transition metal, in particular Fe, Mn, Co, or Ni, M' is Al, Mg, or Ti, X is F, S, or N, $-0.5 \le x \le +0.5$, $0 \le y \le 0.5$, and $0 \le z \le 0.1$).

The conductive material is typically added in an amount of 1 to 50 wt % based on the total weight of a mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The anode active material may be the above-defined materials and further include, for example, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

These lithium titanium oxides have higher potential with respect to Li than graphite and a reaction product between a lithium titanium oxide and an electrolyte and lithium are not deposited at an interface therebetween, which results in excellent safety.

The secondary battery may have a structure in which an electrode assembly including the cathode, the anode, and a separator disposed therebetween is impregnated with a lithium salt-containing electrolyte.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), fluoro-propylene carbonate (FPC), or the like.

In one embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of EC or PC, which is a high dielectric solvent and a cyclic carbonate, and DEC, DMC, or EMC, which is a low viscosity solvent and a linear carbonate.

The present invention also provides a battery module including the secondary battery as a unit battery and a battery pack including the battery module.

The battery pack may be used as a power source for medium and large-scale devices that require stability at high temperature, long cycle life, and high rate characteristics.

Examples of such medium and large-scale devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph showing adhesion of each of anodes manufactured according to Examples 1 to 3 and Comparative Examples 1 to 4.

EFFECTS OF THE INVENTION

As apparent from the foregoing description, a secondary battery according to the present invention includes a high molecular weight binder and thus battery processability may be enhanced due to reduction in resistance and mechanical adhesion may be enhanced. Such effects may be maximized when a predetermined lithium metal oxide in the form of secondary particles is used as an anode active material.

BEST MODE

Now, the present invention will be described in more detail with reference to the following examples. These examples are provided only for illustration of the present invention and should not be construed as limiting the scope and spirit of the present invention.

Example 1

$Li_{1.33}Ti_{1.67}O_4$ (Ishihara LR-106) as an anode active material, SuperC65 as a conductive material, and PVdF homopolymer having a molecular weight of 1,180,000 (Mn) as a binder were added in a weight ratio of 83:5:12 to NMP and mixed therein to prepare an anode mixture. Subsequently, the anode mixture was coated onto an Al foil having a thickness of 20 μm to a thickness of 200 μm and the coated Al foil was pressed and dried, thereby completing fabrication of an anode for secondary batteries.

Example 2

An anode for secondary batteries was manufactured in the same manner as in Example 1, except that the anode active material, the conductive material, and the binder were used in a weight ratio of 87:5:8.

Example 3

An anode for secondary batteries was manufactured in the same manner as in Example 1, except that the anode active material, the conductive material, and the binder were used in a weight ratio of 91:5:4.

Comparative Example 1

An anode for secondary batteries was manufactured in the same manner as in Example 1, except that PVdF homopolymer having a molecular weight of 948,000 was used as the binder.

Comparative Example 2

An anode for secondary batteries was manufactured in the same manner as in Example 1, except that acrylonitrile-acylate copolymer (LSR7 manufactured by Hitachi Chemical) having a molecular weight of 1,150,000 was used as the binder.

Comparative Example 3

An anode for secondary batteries was manufactured in the same manner as in Example 2, except that acrylonitrile-acylate copolymer (LSR7 manufactured by Hitachi Chemical) having a molecular weight of 1,150,000 was used as the binder.

Comparative Example 4

An anode for secondary batteries was manufactured in the same manner as in Example 3, except that acrylonitrile-acylate copolymer (LSR7 manufactured by Hitachi Chemical) having a molecular weight of 1,150,000 was used as the binder.

Experimental Example 1

Adhesion of each of the anodes for lithium secondary batteries of Examples 1 to 3 and Comparative Examples 1 to 4 was measured. Results are illustrated in FIG. 1.

Referring to FIG. 1, it can be confirmed that the anodes of Comparative Examples 2 to 4 exhibit similar or higher adhesion than the anodes of Examples 1 to 3.

Experimental Example 2

The anodes of Examples 1 to 3 and Comparative Examples 1 to 4 and a cathode manufactured by adding $LiNi_{4.5}Mn_{3.5}Co_2O_2$ as a cathode active material, SuperC65 as a conductive material, and PVdF as a binder in a weight ratio of 83:5:12 to NMP, mixing the components to prepare a cathode mixture, coating an Al foil having a thickness of 20 μm with the cathode mixture, and pressing and drying the coated Al foil were prepared.

Subsequently, a polyethylene film (Celgard, thickness: 20 μm) as a separator was disposed between each anode and the cathode and a liquid electrolyte containing 1M $LiPF_6$ in a mixed solvent of EC and DMC (a weight ratio of 10:90 (wt %)) was used, thereby manufacturing 10 mAh lithium secondary batteries. Thereafter, discharge resistances of the lithium secondary batteries were measured. Results are shown in Table 1 below.

TABLE 1

|  | SOC 50 (wt %) | Monocell (ohm) |
|---|---|---|
| Example 1 | 12 | 1.28 |
| Example 2 | 8 | 1.33 |
| Example 3 | 4 | 1.27 |
| Comparative Example 1 | 12 | 1.62 |
| Comparative Example 2 | 12 | 1.67 |
| Comparative Example 3 | 8 | 1.72 |
| Comparative Example 4 | 4 | 1.51 |

From the results shown in Table 1 and FIG. 1, it can be confirmed that the lithium secondary batteries of Comparative Examples 2 to 4 exhibit relatively high adhesion, while having high discharge resistance due to high resistance of the binder used.

Experimental Example 3

Charge resistances of the batteries of Experimental Example 2 were measured. Results are shown in Table 2 below.

TABLE 2

|  | SOC 50 (wt %) | Monocell (ohm) |
|---|---|---|
| Example 1 | 12 | 1.12 |
| Example 2 | 8 | 1.14 |
| Example 3 | 4 | 1.12 |
| Comparative Example 1 | 12 | 1.29 |
| Comparative Example 2 | 12 | 1.34 |
| Comparative Example 3 | 8 | 1.36 |
| Comparative Example 4 | 4 | 1.30 |

From the results shown in Table 2 and FIG. 1, it can be confirmed that the batteries of Comparative Examples 2 to 4 exhibit relatively high adhesion, while having high charge resistance due to high resistance of the binder used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An anode for secondary batteries, in which an anode mixture comprising an anode active material and a binder is coated on a current collector,
    wherein the binder comprises a homopolymer having a molecular weight of 1,100,000 to 1,300,000,
    wherein the homopolymer is polyvinylidene fluoride (PVdF),
    wherein an amount of the binder is 4 wt. % to 12 wt. % based on an amount of solids of the anode mixture, and wherein the anode active material comprises a lithium metal oxide of $Li_{1.33}Ti_{1.67}O_4$.

2. A secondary battery comprising the anode according to claim 1.

3. The secondary battery according to claim 2, wherein the secondary battery is a lithium secondary battery.

4. A battery module comprising the secondary battery according to claim 2 as a unit cell.

5. A battery pack comprising the battery module according to claim 4.

6. A device comprising the battery pack according to claim 5.

7. The device according to claim 6, wherein the device is an electric vehicle, a hybrid electric vehicle, a plug-in hybrid electric vehicle, or a system for storing power.

* * * * *